United States Patent
Alanko et al.

[19]

[11] Patent Number: 5,843,541
[45] Date of Patent: Dec. 1, 1998

[54] LIQUID CRYSTALLINE COPOLY(ESTER-IMIDE)S AND A PROCESS FOR THE PREPARATION THEREOF

[75] Inventors: Heli Alanko, Mäntyharju, Finland; Hans Kricheldorf, Hamburg, Germany; Ari Salmela, Huuvari, Finland

[73] Assignee: OPTATECH Corporation, Espoo, Finland

[21] Appl. No.: 765,334

[22] PCT Filed: Jun. 30, 1995

[86] PCT No.: PCT/FI95/00381

§ 371 Date: Dec. 23, 1996

§ 102(e) Date: Dec. 23, 1996

[87] PCT Pub. No.: WO96/01284

PCT Pub. Date: Jan. 18, 1996

[30] Foreign Application Priority Data

Jul. 1, 1994 [FI] Finland ................................. 943188

[51] Int. Cl.⁶ .......................... B29D 22/00; B32B 1/08; C08G 69/08

[52] U.S. Cl. ................... 428/35.7; 528/272; 528/292; 528/296; 528/298; 528/302; 528/308; 528/310; 525/437; 525/444; 525/445; 525/450; 525/540; 428/35.7; 428/36.3; 428/364; 428/373

[58] Field of Search ................... 528/272, 292, 528/296, 298, 302, 308, 310; 525/437, 444, 445, 450, 540; 428/35.7, 36.3, 364, 373

[56] References Cited

U.S. PATENT DOCUMENTS

| | | | |
|---|---|---|---|
| 3,542,731 | 11/1970 | Culbertson | 260/47 |
| 3,804,805 | 4/1974 | Kuhfuss et al. | 260/47 |
| 4,395,513 | 7/1983 | Calundann | 524/599 |
| 4,948,863 | 8/1990 | Dicke et al. | 528/170 |
| 4,954,606 | 9/1990 | Dicke et al. | 528/170 |

FOREIGN PATENT DOCUMENTS

| | | |
|---|---|---|
| 0 347 548 A1 | 12/1989 | European Pat. Off. . |
| 30 15 386 A 1 | 11/1980 | Germany . |
| 37 37 067 A 1 | 5/1989 | Germany . |

OTHER PUBLICATIONS

Eur. Polym. J. vol. 28, No. 3, pp. 261–265, 1992.
Eur. Polym. J. vol. 30, No. 4, pp. 1–8, 1994.
Macromolecules, vol. 24, No. 5, pp. 1011–1016, 1991.
Macromolecules, vol. 26, No. 19, pp. 5161–5168, 1993.
Abstract of Japanese Patent No. JP62161832 A2.
Abstract of Japanese Patent No. JP01185326 A2.
Abstract of Japanese Patent No. JP03033125 A2.
Chemical Abstracts vol. 108:39533z.
Chemical Abstracts vol. 112:79312r.
Chemical Abstracts vol. 116:217008.

Primary Examiner—Samuel A. Acquah
Attorney, Agent, or Firm—Cohen, Pontani, Lieberman & Pavane

[57] ABSTRACT

The present invention relates to liquid crystalline copoly (ester-imides) and a process for the preparation thereof. In particular, the invention relates to liquid crystalline copoly (esteri-imides) comprising structural units derived from N-(3'-hydroxyphenyl)-trimellitic acid imide or N-(4'-carboxyphenyl)trimellitic acid imides optionally in combination with aromatic dicarboxylic acids, dioles or hydroxy acids. The invention also concerns the use of these copolymers in polymer blends, in moulded articles, in fibres, filaments and sheets.

41 Claims, 7 Drawing Sheets

LIQUID CRYSTALLINE COPOLY(ESTER-IMIDE)S AND A PROCESS FOR THE PREPARATION THEREOF

FIELD OF THE INVENTION

The present invention relates to liquid crystalline copoly (ester-imide)s and to a process for the preparation thereof. In particular, the invention concerns liquid crystalline copoly (ester-imide)s containing structural units derived from N-(3'-acetoxyphenyl)-tri-mellitic acid imide or N-(4'-carboxyphenyl)trimellitic acid imide optionally in combination with aromatic dicarboxylic acids, diols or hydroxyacids, in particular 2,6-hydroxynaphthoic acid. Furthermore the invention concerns a process for the preparation of these copolymers. The invention also relates to their use in polymer blends, in moulded articles, fibres, filaments and sheet products.

DESCRIPTION OF RELATED ART

Various copoly(ester-imide)s containing derivatives of trimellitic acid anhydride are known to be thermally stable engineering plastics. The synthesis of trimellitic acid anhydride with aminophenols or aminobenzoic acids yields corresponding imides, as described in the published DE Patent Application No. 3,737,067 and Kricheldorf et al. *Macromolecules* 24 (1991) 1011.

Homopoly(ester-imide)s of different hydroxyphenyl trimellitic acid imides are described in U.S. Pat. No. 3,542,731. Binary copoly(ester-imide)s of N-(3'-hydroxyphenyl) trimellitic imide and N-(4'-carboxyphenyl)trimellitic imide, respectively, with 2-hydroxy-6-naphthoic acid, 3-phenyl-1,4-dihydroxybenzene and 3-(tert-butyl)-1,4-dihydroxybenzene, having the following formulas

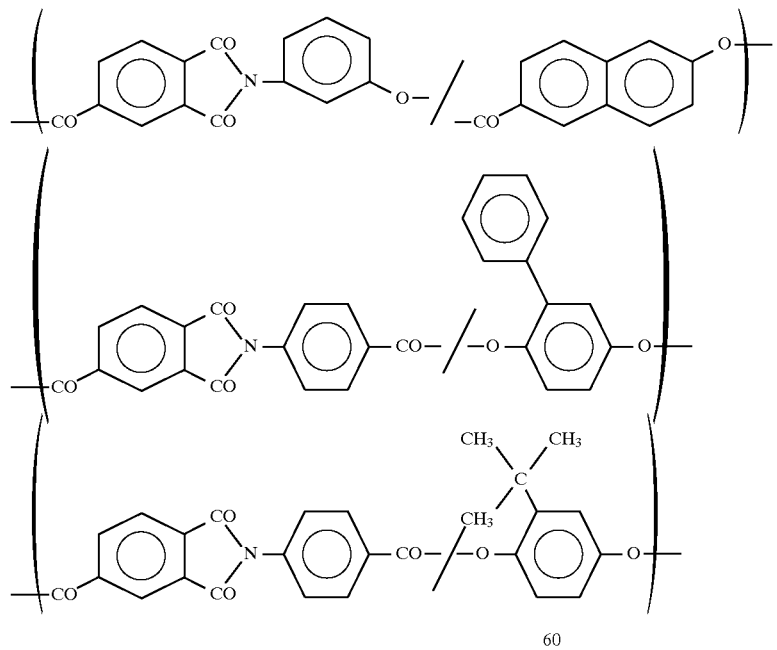

are disclosed in Kricheldorf et al. *Eur. Polym. J.* 30 (1994): 4, 549; Kricheldorf et al. *Macro-molecules* 26 (1993), U.S. Pat. No. 4,954,606.

However, all these binary copoly(ester-imide)s possess glass transition temperatures ($T_g$) of around or above 200° C. or melting points of over 300° C., which are too high for blending with thermoplastic polymers, such as polyolefins.

On the other hand, nematic copolyesters of poly(ethylene terephthalate) and 4-acetoxy-benzoic acid (e.g. Rodrun LC-3000® and Rodrun LC-5000® of Unitika) are commercial, but their $T_g$'s are too low for practical purposes (60°–80° C.), or they are semicrystalline with high contents of 4-acetoxybenzoic acid (cf. U.S. Pat. No. 3,804,805). The LC-polyester of Hoechst Celanese (Vectra A950®), described in DE Patent No. 3,015,386, U.S. Pat. No. 4,395,513, is semicrystalline and its $T_m$, 280° C., is much too high for melt processing with thermoplastics.

SUMMARY OF THE INVENTION

Based on what has been stated above, it is an object of the present invention to provide liquid crystalline polymers having high glass transition temperatures and good thermal stabilities which are suitable for blending with other polymeric components.

It is another object to provide a process for preparing such polymers.

It is a third object to provide polymer blends as well as fabricated products based on the novel polymers.

The present invention is based on the finding that certain copoly(ester-imide)s based on aromatic polyesters (containing phenylene of naphthalenylene residues in the main chain) possess all the properties required of blend components. In particular the present invention provides copoly(ester-imide)s containing at least one structural unit of formula (I)

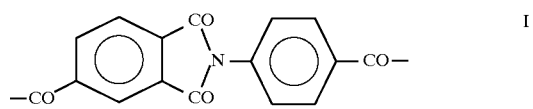

or formula (II)

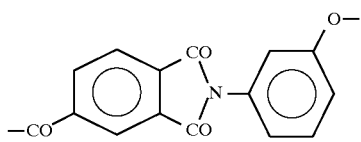
II and a structural unit of formula (III)

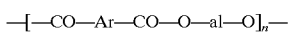

wherein Ar is a phenylene or naphthalenylene group, al is an acyclic or cyclic aliphatic residue with 1 to 6 carbon atoms, n is an integer from 1 to 500, the molar ratio between the structural unit of formula (III) and the structural unit of formula (I) or formula (II), respectively, being from 1:100 to 100:1.

The structural unit of formula (III) can, for instance, be comprised of poly(ethylene therephthalate) of formula IIIa

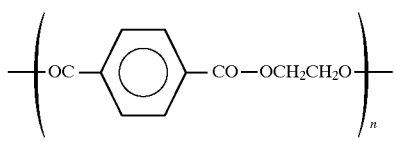
IIIa or poly(ethylene naphthalate) of formula IIIb

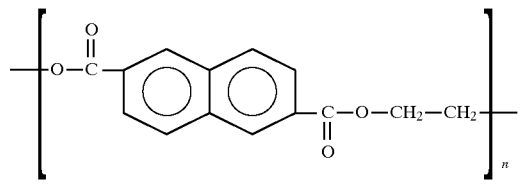
IIIb or poly(butylene terephthalate) of formula IIIc,

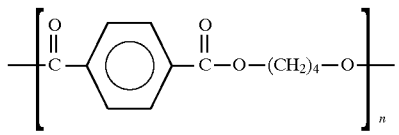
IIIc wherein n has the same meaning as above.

The process according to the invention comprises the step of polycondensing an aromatic polyester, such as poly (ethylene terephthalate), poly(ethylene naphthalate), poly (butylene terephthalate), poly(butylene naphthalate) or poly (cyclohexanol terephthalate) with N-(3-hydroxyphenyl) trimellitic acid imide or with N-(4'-carboxyphenyl) trimellitic acid imides or with derivatives thereof.

DETAILED DESCRIPTION OF THE INVENTION

Definitions

Figure 1:
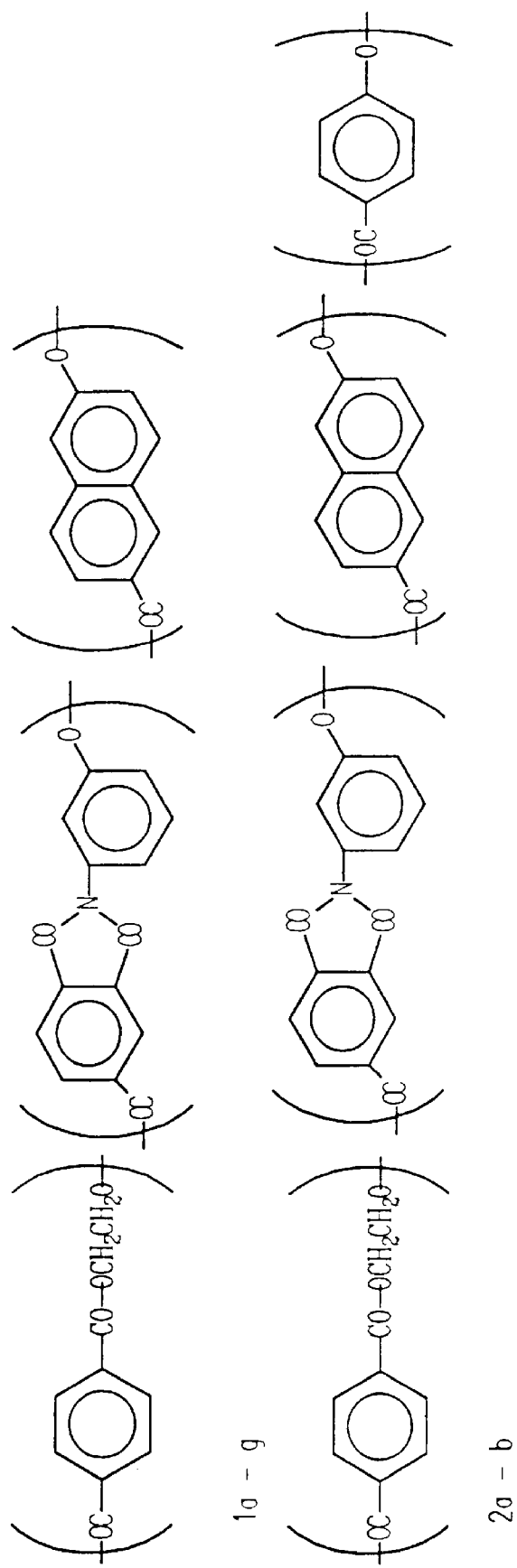
FIG. 1 indicates the structural units of the polymers prepared in Examples 1 and 2, FIG. 2 indicates the structural units of the polymers prepared in Examples 3 and 4, FIGS. 3A and 3B indicate the structural units of the polymers prepared in Examples 5 and 6, FIG. 4 indicates the structural units of the polymers prepared in Examples 7 and 8, FIG. 5 indicates the structural units of the polymers prepared in Example 9.

Within the scope of the present invention, the term "isotropic polymer" designates any thermoplastic polymer which does not decompose below its melting point and which therefore can be melt processed.

The terms "anisotropic polymer" or "liquid crystalline polymers (LCP's)" are interchangeably used for polymers which in liquid state, in particular as a melt (=thermotropic LCP's), lie between the boundaries of solid crystals and isotropic liquids.

For the purpose of this description the term "compatibilizer" means a substance which promotes the compatibility of the isotropic and anisotropic components of the compounds.

The absolute values of the molecular weights of the present novel copoly(ester-imide)s have not been determined. Instead, the molecular weights of the various copolymers are characterized by their inherent viscosities. Thus, "low-molecular weight copoly(ester-imide)s" are copolymers having viscosities below approximately 0.6, typically below 0.5. Engineering plastics are generally required to have viscosities in the range of 0.6 to 1.0.

The Novel Copoly(Ester-Imide)s

This application is based on the concept of providing thermotropic copoly(ester-imide)s wherein an aromatic polyester, such as a poly(alkylene terephthalate) or poly (alkylene naphthalate) is used as one of the starting materials. These copoly(ester-imide)s can be employed as engineering plastics. That is, the present invention provides thermotropic co(polyester-imide)s comprising a) at least one structural unit derived from an aromatic polyester, and
b) at least one structural unit derived from N-(3'-hydroxyphenyl)trimellitic acid imide or N-(4'-carboxyphenyl) trimellitic acid imide.

These poly(ester-imide)s can be molded by injection molding; they exhibit excellent dimensional stability and heat resistance and can therefore be used in moulded articles, fibres, filaments and sheet products.

The advantageous properties of the present copoly(ester-imide)s are quite surprising because many other copoly (ester-imide)s do not form liquid crystalline polymers, not to mention that their properties would render them suitable for use in the preparation of polymer blends. Thus, for instance, copoly(ester-imide)s based on bisphenol-A, or disubstituted hydroquinones are mostly all isotropic. Hydroquinones with small substituents (—$CH_3$, —Cl) and dihydroxynaphthalenes in combination with N-(3'-carboxy-phenyl)trimellitic acid imide yield semicrystalline poly(ester-imide)s with high melting points, Kricheldorf et al. *Eur. Polym. J.* 28 (1993), Kricheldorf et al. *Macromolecules* 24 (1991).

The present invention also provides low-molecular weight copoly(ester-imide)s containing at least one poly (alkylene terephthalate) or poly(alkylene naphthalate) or poly(cyclohexanol terephthalate) with thermotropic character designed to serve as reinforcing components in blends with polyolefins, in particular polypropylene and polyethylene, or poly(phenylene oxide) (PPE), as matrix components, and a method for producing the same. During prosessing, these poly(ester-imide)s have the advantage of a lower melt viscosity than the above-described prior art poly(ester-imide)s. Generally, for blending purposes liquid crystalline polymers have to meet the following requirements:

I. The LCP's should be non-crystalline (amorphous), so that their properties are independent of the thermal history, and thus, easier to reproduce.

II. The glass transition temperatures of these polymers should be in the range of 110° to 160° C. The lower limit should be higher than the temperature of boiling water to warrant a sufficient heat distortion temperature under common service conditions. The upper limit is given by two considerations. The $T_g$ should be lower than the melting temperature of polyolefins to ensure an easy flow and deformation during processing in the molten state.

III. The polymer melt should be nematic to ensure a low melt viscosity during processing of the blend, so that an easy deformation of the molten domains into lengthy particles with good reinforcing capability is feasible. Furthermore, the melt viscosity of the entire blend should be lowered.

The novel, thermoplastic, liquid crystalline aromatic poly (ester-imide)s described in this invention meet all the above criteria.

According to a preferred embodiment of the present invention, the polymers are melt processed at temperatures at least approximately corresponding to the temperatures characteristic for the heat-resistance of the liquid crystalline polymer ($T_g$ and HDT). Based on this feature the present LCP's are blended with, for instance, polypropylene at so low temperature that the polypropylene does not decompose thermally. Still a blend with good heat-resistance is obtained. As mentioned above, low processing temperature are primarily obtained if the LCP is amorphous. Particularly advantageous polymers contain ethylene groups, which can be derived from poly(ethylene terephthalate) (PET) or poly (ethylene naphthalate) (PEN). However, the heat-resistance of such an amorphous LCP ($T_g$ and HDT) is often too low if it does not contain bulky side groups, such as tertiary butyl hydroquinone.

For the above reason, it is preferred to include structural units derived from tert-butyl hydroquinone or similar bulky monomers in those LCP's of the present invention which contain structural units derived from PET or PEN. However, such monomers can well be used in polymers containing poly(butylene terephthalate) and poly(butylene naphthalate) and poly(cyclohexanol terephthalate) based structural units.

Thus, the copoly(ester-imide)s according to the invention preferably contain in addition to the imide and the aromatic polyester based structural units also aromatic hydroxy acids and diacids known per se in liquid crystalline copolymers. The 2-hydroxy-6-naphthoic acid, 3-phenyl-1,4-dihydroxybenzene and 3-(tert-butyl)-1,4-dihydroxybenzene may be mentioned as particularly preferred components.

Based on what has been stated above, the novel copoly (ester-imide)s contain (a) at least one structural unit derived from N-(4'-carboxyphenyl)trimellitic acid imide of formula (I) or N-(3'-hydroxyphenyl)trimellitic acid imide of formula (II), (b) at least one structural unit derived from an aromatic polyester of formula (III), wherein n is an integer from 1 to 500, and (c) in combination with (I), at least a structural unit derived from hydroquinone (V),

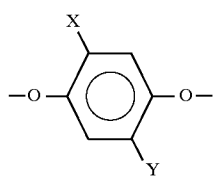

wherein each X and Y independently represents hydrogen, chloro, or a phenyl group, or an alkyl group having 1 to 4 carbon atoms, or (d) in combination with (II), at least one structural unit derived from 2-hydroxy-6-naphthoic acid (VII)

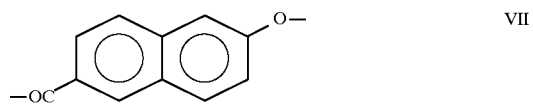

or a derivative thereof,

The structural unit of formula (II) can also be combined with a structural unit of formula (IV)

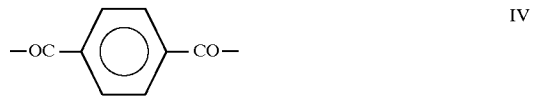

The copoly(ester-imide)s of present invention may also contain one aromatic dicarboxylic acid or derivative thereof in combination with (II) and/or a structural unit derived from (VI).

The poly(ester-imide) of the present invention comprising the structural units II, III and VII or the structural units II, III, VI and VII is produced by polycondensing one or more aromatic polyester(s) of formula III, such as poly(ethylene terephthalate), poly(ethylene naphthalate), poly(butylene terephthalate), poly(butylene naphthalate) or poly (cyclohexanol terephthalate), at least one hydroxyacid or derivative thereof and at least N-(3'-hydroxy-phenyl) trimellitic acid imide or derivative thereof, in such an amount that the molar ratio of III:(II+VII) or III:(II+VI+VII) is substantially from 1:99 to 60:40, preferably from 5:95 to 60:40, in particular 10:90 to 50:50, and the molar ratio of II:VII or II:(VI+VII) is from 1:100 to 100:1.

The poly(ester-imide) of the present invention comprising the structural units I, IIi and V or the structural units I, III, V and VI or the structural units I, III, V and VII is produced by polycondensing one or more aromatic polyester(s), such as a poly(alkylene terephthalate) or poly(alkylene naphthalate), at least one hydroquinone or derivative thereof, at least hydroxyacid or derivative thereof and at least N-(4'-carboxyphenyl)-trimellitic acid imide or derivative thereof, in such an amount that the molar ratio of III:(I+V) or III:(I+V+VI) or III:(I+V+VII) is substantially from 1:99 to 60:40, preferably from 5:95 to 60:40, in particular from 10:90 to 50:50, and the molar ratio of I:V is 0.8:1 to 1:0.8 and I:(V+VI) or I:(V+VII) is from 1:100 to 100:1.

The poly(ester-imide) of the present invention comprises the structural units I, III–VI or the structural units I, III–VII or the structural units I, III–V and VII is produced by polycondensing (an) aromatic polyester(s), such as a poly (alkylene terephthalate) and/or poly(alkylene naphthalate), at least one hydroquinone or derivative thereof, at least hydroxyacid or derivative thereof and at least N-(4'-carboxyphenyl)trimellitic acid imide or derivative thereof and at least one dicarboxylic acid or derivative thereof, on such an amount that the molar ratio of III:(I+IV+V+VI) or
III:(I+IV+V+VI+VII) or
III:(I+IV+V+VII) is substantially from 1:99 to 60:40, preferably from 5:95 to 60:40, in particular from 10:90 to 60:40, and the molar ratio of (I+IV):V is 1:1 and I:(IV+V+VI) or I:(IV+V+VI+VII) is from 1:100 to 100:1.

Preferred embodiments comprise polymers wherein the molar ratio of the structural units of formula (II) to the structural units of formula (VII) and optionally (VI) is from 1:100 to 100:1.

Particularly preferred embodiments are represented by liquid crystalline copoly(ester-imide)s containing the structural units derived from N-(4'-carboxyphenyl)trimellitic acid, 1,4-benzene dicarboxylic acid, substituted 1,4-dihydroxybenzene, an aromatic hydroxyacid and poly (ethylene terephthalate) and/or poly(ethylene naphthalate).

Polymers containing structural units derived from N-(4'-carboxyphenyl)trimellitic acid are generally preferred because said units are excellent mesogens. Of the aromatic esters, the naphthalates are preferred for polymer applications wherein somewhat higher $T_g$'s are of interest. The terephthalates provide lower $T_g$'s and are more inexpensive as starting materials. It should be noticed that the present LCP's may contain mixtures of the aromatic polyesters, and the aromatic polyesters used can either be homopolymers (i.e. composed of one kind of monomers only) or copolymers, comprising for instance both terephthalic and naphthalenic structural units.

The glass transition temperatures of the novel copoly (ester-imide)s are about 100° to 190° C., preferably about 105° to 175° C., and the inherent viscosity of said polymers, measured in a mixture of $CHCl_3$ and trifluoroacetic acid at a concentration of 2 g/l, about 0.4 to 1.0 dL/g, preferably about 0.45 to 0.80 dL/g.

The inherent viscosity of the poly(ethylene terephthalate) used as a starting compound is typically about 0.5 to 1.0 dL/g.

The Isotropic Polymer Component of the Polymer Blends

The isotropic polymer component of polymer blends and compounds containing the novel liquid crystalline polymers can comprise any suitable thermoplastic or thermosetting polymer material. Preferably thermoplastic polymers are employed as matrix polymers. The isotropic polymers can be selected from the group comprising polyolefins and copolymers of olefinic monomers, polyesters, polyamides, polyethers, polystyrene, polyvinylchloride, polyacrylics, e.g. poly-R-acrylate or poly-R-methacrylate, wherein R is methyl, ethyl, butyl or a similar substituent, polycarbonates, polyketones (e.g. polyetheretherketone), polyetherimides and polyimides. Typical comonomers are vinyl acetate, butyl acrylate, methyl acrylate and ethyl acrylate.

As specific examples of the isotropic polymers, the following may be mentioned: polyolefins such as polyethylene, polypropylene, polybutylene, polyisobutylene, poly(4-methyl-1-pentylene), including copolymers of ethylene and propylene (EPM, EPDM) and chlorinated (PVC) and chlorosulphonated polyethylenes. The isotropic polymer may also be comprised of the corresponding polyalkanes, which contain styrene (PS), acryl, vinyl and fluoroethylene groups, and different polyesters, such as poly(ethylene terephthalate), poly(butylene terephthalate) and polycarbonate, polyamides and polyethers (e.g. poly (phenylene ether). Particularly preferred polymers are the polyolefins, polyesters and poly(phenylene ether).

The molecular weights of the preferred isotropic thermoplastic polymers are usually in a range from about 5,000 to 50,000, preferably about 10,000 to 30,000. The flexural modulus (0.5–0.25%) of the matrix polymer is preferably about 100–10,000 MPa, in particular about 500–5000 MPa.

Compatibilizers can be used in the polymer blends and compounds according to the invention. The compatibilizer can be finctionalized or unfunctionalized. The functionilized compatibilizers typically contain functional groups such as carboxy, anhydride, epoxy, oxazolino, hydroxy, isocyanate, acylacetam and carbodiimide groups. The polymer residues of the compatibilizer can comprise co- and terpolymers, grafted polyolefins, grafted polystyrene and thermoplastic elastomers. The polar groups of polyolefinic copolymers are generally acrylic esters, functional acrylic acid groups, and maleic anhydride groups. The polar groups of the terpolymers can be maleic anhydride groups, hydroxyl groups and epoxy groups, of which the first-mentioned are particularly preferred. The styrene block copolymers can consist of polystyrene segments and flexible elastomer segments. Typical styrene block copolymers are SBS (styrene/butadiene/styrene-copolymer), SIS (styrene/isoprene/styrene-copolymer) and SEBS (styrene/ethylene butylene/styrene-copolymer).

In connection with poly(phenylene ether), certain cyclic compounds can be used as compatibilizers, said compounds having the general formula $A_i$–$B_j$, wherein A is a group containing at least one 3 to 7-membered ring capable of forming ring-to-ring interactions with the phenyl rings of PPE, B is a polar group and i is an integer 1 to 20 and j is an integer 0 to 20, the sum of i and j being greater than 2 and the melting point of said compound being over 50° C. and the boiling point above 200° C. As specific examples of such compatibilizing compounds, hydroquinone, t-butyl-hydroquinone, bisphenol A, benzoic acid, benzamide and phenyl-terephthalic acid can be mentioned.

Of the polymer blend additives, fillers, pigments and various substances which promote the processing of the blend can be mentioned.

Plastic additives known per se can be added to the polymer blend according to the invention. These additives comprise, for instance, stabilizers, colouring agents, lubricants, antistatic agents, fillers and fire retardants. If desired, these substances can be premixed with, e.g., the isotropic polymer before forming the polymer blend. The amounts of polymer additives are typically about 0.01 to 5%, preferably about 0.1 to 10% of the weight of the polymer blend.

Method of Preparation

To perform above-described reactions of the various components of the novel copoly(ester-imide)s, any method known to produce polyesters can be employed. Suitable condensation techniques are for example:

A) The method known as the "acetate method", wherein each of the hydroxy compounds are used in the form of acetylated derivative thereof, and the carboxylic acids are used as they are. The acetylated derivative is selected from lower alkyl compounds, preferably the acetylating reactant is acetic anhydride. Usual transesterification catalysts can be used.

B) A method where the hydroxy compounds and the carboxy compounds are used as they are with an acylating reactant. The acylating reactant can be selected from lower alkyl anhydrides, preferably the acetylating reactant is acetic anhydride. Usual transesterification catalysts may be used.

The polycondensation reaction using above described reaction materials is generally carried out between temperatures of from 60° C. to 300° C., preferably from 185° C. to 285° C., at pressure from atmospheric pressure or lower, and in the latter stage, it is preferred to carry out the reaction at vacuo, preferably at 0.01–1 mbar. The reaction time varies from several minutes to several hours, depending on the degree of polymerization and a molecular weight of the polymer needed. Conventional transesterification catalysts such as titanium oxide, antimony oxide, tin octoate etc. can be used.

The poly(ester-imide)s of the present invention can be molded at usual molding temperatures of 300° C. or less, and any molding method employed for thermoplastic materials, such as compression molding, injection molding, blow molding, extrusion, melt spinning or deep can be used. These poly(ester-imide)s can be therefore used in moulded articles, fibres, filaments films and sheet products. The poly(ester-imide)s can also be used in tubes, pipes or sheaths, or can be shaped into parts of a cable or into a sheath of a cable.

Thus, in summary, the process according to the present invention comprises the following preferred embodiments:

Preparing a liquid-crystalline polymer by polycondensing poly(ethylene terephthalate) (or another of the aromatic polyesters mentioned above, or a mixture thereof) and N-(3'-hydroxyyphenyl)-trimellitic acid imide or derivatives thereof with 2-hydroxy-6-naphthoic acid or a derivative thereof and/or with a 1,4-benzene dicarboxylic acid or a derivative thereof. The molar ratio of the polyester(s) to the sum of the imide and the naphthoic acid and carboxylic acid is maintained at about 1:99 to 60:40, preferably 5:95 to 60:40, in particular 10:90 to 50:50.

Preparing a liquid-crystalline polymer by polycondensing poly(ethylene terephthalate) (or another of the aromatic polyesters mentioned above, or a mixture thereof) and N-(4'-carboxyphenyl)trimellitic acid imide or derivatives thereof with a substituted 1,4-dihydroxybenzene, the substituent comprising hydrogen, chloro, phenyl or a $C_{1-12}$-alkyl, preferably a $C_{1-4}$-alkyl, and/or with 4-hydroxybenzoic acid or a derivative thereof. The molar ratio of the polyester(s) to the sum of the imide and the dihydroxybenzene and the benzoic acid is about 1:99 to 60:40, preferably 5:95 to 60:40, in particular 10:90 to 50:50.

The following examples are presented as illustrations of the claimed invention. It should be noticed that the invention is not limited to the specific details set forth in the examples.

EXAMPLE 1

This example illustrates the preparation of a liquid crystalline copoly(ester-imide) from poly(ethylene terephthalate), N-(3'-acetoxyphenyl)trimellitic acid imide and 2-acetoxy-6-naphthoic acid (cf. formulas 1b–1g in FIG. 1).

A mixture of 5.76 g (0.03 moles) of poly(ethylene terephthalate), 2.93 g (0.009 moles) of N-(3'-acetoxyphenyl) trimellitic acid imide and 8.29 g (0.036 moles) 2-acetoxy-6-naphthoic acid is placed in a 100-ml. flask equipped with a stirrer and an inlet and outlet for nitrogen. The flask is evacuated and purged three times with nitrogen at 110° C. and finally heated in an oil bath to 280° C. during 30 minutes. As the mixture is stirred at 280° C. in an nitrogen atmosphere, acetic acid slowly distils from the flask. After 120 min. most of the acid has evolved and a low melt viscosity poly-(ester-imide) is obtained. A vacuum of 0.5 mbar is then applied at 280° C., and stirring is continued for four hours. A white, opaque, fibrous copoly(ester-imide) is obtained. The totally amorphous liquid crystalline copoly (ester-imide) has an inherent viscosity of 0.36 and a glass transition temperature of 131° C.

The polymerization was repeated using 20, 30, 40, and 50 mole percent of poly(ethylene terephthalate) and different molar ratios of comonomers. Table 1 lists the basic properties of these polymers.

TABLE 1

Yields and properties of poly(ester-imides) (formulas 1a–1d)

| Formula | m/n/p[a] | Yield (%) | $\eta_{inh}$[b] (dL/g) | $T_g$[c]/ °C. | $T_m$[c]/ °C. |
|---|---|---|---|---|---|
| 1a | 40/--/60 | 65.4 | 0.83 | 82 | 205 (weak) |
| 1b | 40/12/48 | 87.2 | 0.36 | 104/131 | amorph. |
| 1c | 40/18/42 | 66.6 | 0.34 | 109/139 | amorph. |
| 1d | 40/24/36 | 67.6 | 0.28 | 112/138 | amorph. |
| 1e | 50/15/35 | 82.5 | 0.36 | 99/129 | amorph. |
| 1f | 30/21/49 | 76.2 | 0.34 | 121/147 | amorph. |
| 1g | 20/24/56 | 90.6 | —[d] | 153 | 230 |

[a]molar feed ratio
[b]measured at 20° C. with c = 2g/L in $CHCl_3$/trifluoroacetic acid (6/4) by volume
[c]from DSC measurements with a heating rate of 20° C./min It can be seen that the glass transition temperatures of these totally amorphous liquid crystalline poly(ester imide)s are much higher than that of a conventional poly(ethylene terephthalate)/4-acetoxybenzoic acid-materials, such as commercial Rodrun LC-poly-esters (cf. comparative example 2), and that said temperatures can be controlled with the amount of poly(ethylene terephthalate). Glass transition temperatures as high as 100° C. could be achieved even with 50 mole percent of poly(ethylene terephthalate). These properties are suitable for typical reinforcing materials used in composites.

COMPARATIVE EXAMPLE 1

This example illustrates the preparation of a copolyester from poly(ethylene terephthalate) and 4-acetoxybenzoic acid.

A mixture of 7.68 g (0.04 moles) of poly(ethylene terephthalate), 10.40 g (0.06 moles) 4-acetoxybenzoic acid is placed in a 100-ml. flask equipped with a stirrer and an inlet and outlet for nitrogen. The flask is evacuated and purged three times with nitrogen at 110° C. and finally heated in an oil bath to 275° C. for 30 minutes. As the mixture is stirred at 275° C. in an nitrogen atmosphere, acetic acid slowly distils from the flask. After 60 min. most of the acid has evolved and a low melt viscosity polyester is obtained. A vacuum of 0.5 mbar is then applied at 275° C., and stirring is continued for four hours. A white, opaque, fibrous copolyester is obtained. The liquid crystalline copolyester has an inherent viscosity of 0.60, a glass transition temperature of 62° C. and a melting temperature of 212° C. This polymer is known as first presented by Jackson and Kuhfuss, U.S. Pat. No. 3,804,805. As far as polymer blends are concerned, the low glass transition temperature and a crystalline nature of this polymer are not favourable properties as far as polymer blends are concerned.

COMPARATIVE EXAMPLE 2

This example illustrates the preparation of a copolyester from poly(ethylene terephthalate) and 2-acetoxy-6-naphthoic acid.

A mixture of 5.76 g (0.03 moles) of poly(ethylene terephthalate), 10.36 g (0.045 moles) of 2-acetoxy-6-naphthoic acid is placed in a 100-ml. flask equipped with a stirrer and an inlet and outlet for nitrogen. The flask is evacuated and purged three times with nitrogen at 110° C. and finally heated in an oil bath to 275° C. for 30 minutes. As the mixture is stirred at 275° C. in an nitrogen atmosphere, acetic acid slowly distils from the flask. After 60 min. most of the acid has evolved and a low melt viscosity polyester is obtained. A vacuum of 0.5 mbar is then applied at 275° C., and stirring is continued for four hours. A white, opaque, fibrous copolyester has an inherent viscosity of 0.83, a glass transition temperature of 82° C. and a melting temperature of 205° C. As illustrated in the comparative example 1, also in this case, when the 4-acetoxybenzoic acid is replaced totally by 2-acetoxy-6-naphthoic acid the low glass transition temperature and a crystalline nature of this polymer are unfavourable properties regarding to polymer blends.

EXAMPLE 2

This example illustrates the preparation of a copoly(ester-imide) from poly(ethylene terephthalate), N-(3'-acetoxyphenyl)trimellitic acid imide and a mixture of 2-acetoxy-6-naphthoic acid and 4-acetoxybenzoic acid (cf. formulas 2a and 2b in FIG. 1)

A mixture of 5.76 g (0.03 mole) of poly(ethylene terephthalate), 2.93 g (0.009 mole) of N-(3'-acetoxyphenyl) trimellitic acid imide, 4.14 g (0.018 mole) 2-acetoxy-6-naphthoic acid and 3.24 g (0.018 mole) 4-acetoxybenzoic acid is placed in a 100-ml. flask equipped with a stirrer and an inlet and outlet for nitrogen. The flask is evacuated and purged three times with nitrogen at 110° C. and finally heated in an oil bath to 280° C. for 30 minutes. As the mixture is stirred at 280° C. in an nitrogen atmosphere, acetic acid slowly distils from the flask. After 120 min. most of the acid has evolved and a low melt viscosity poly(ester-imide) is obtained. A vacuum of 0.5 mbar is then applied at 280° C., and stirring is continued for four hours. A white, opaque, fibrous copoly(ester-imide) is obtained. The totally amorphous liquid crystalline copoly(esterimide) has a glass transition temperature of 120° C.

The polymerization was repeated using 20 mole percent of poly(ethylene terephthalate). Table 2 lists the basic properties of these polymers.

TABLE 2

Yields and properties of poly(ester-imides) 2a and 2b

| Formula | m/n/o/p[a] | Yield (%) | $T_g^{b)}$/ °C. | $T_m^{b)}$/ °C. |
|---|---|---|---|---|
| 2a | 40/12/24/24 | 70.5 | 120 | amorph. |
| 2b | 20/16/32/32 | 91.8 | 95/158 | 205 |

[a] molar feed ratio
[b] from DSC measurements with a heating rate of 20° C./min As will appear from the above data, when the 2-acetoxy-6-naphthoic acid is replaced partly by 4-acetoxybenzoic acid found to be useful in this invention the glass transition temperatures of these poly(ester imide)s are still comparatively high, although lower than illustrated in Example 1. These properties are still suitable for typical reinforcing materials used in composites.

EXAMPLE 3

Figure 2:
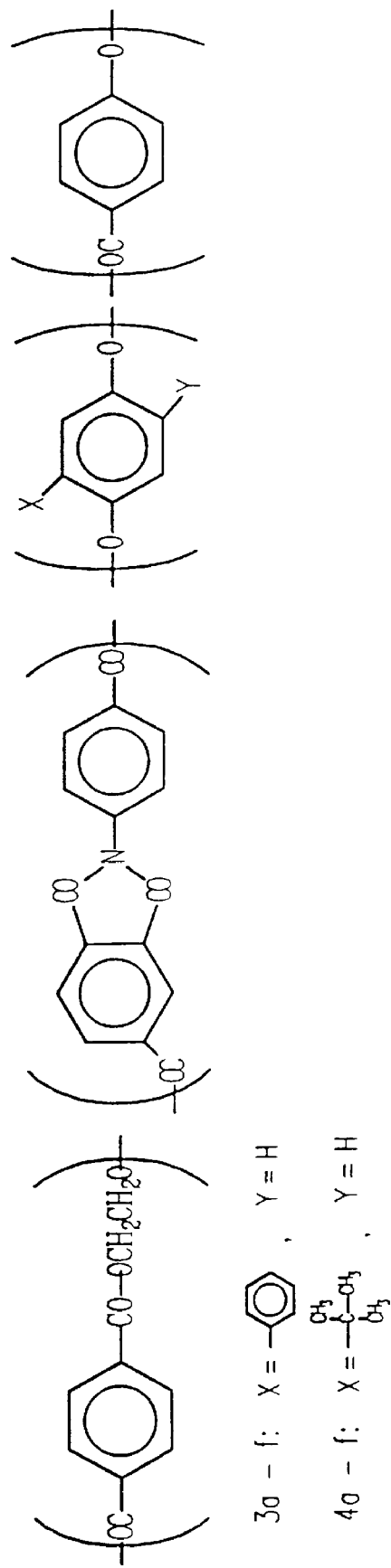

This example illustrates the preparation of a copoly(ester-imide) from poly(ethylene terephthalate), N-(4'-carboxyphenyl)trimellitic acid imide, 3-phenyl-1,4-diacetoxy-benzene and 4-acetoxybenzoic acid (cf. formulas 3a–3f in FIG. 2).

A copoly(esterimide) is prepared with 5.76 g (0.03 mole) of poly(ethylene terephthalate), 4.20 g (0.014 mole) of N-(4'-carboxyphenyl)trimellitic acid imide, 3.64 g (0.014 mole) 3-phenyl-1,4-diacetoxybenzene and 3.24 g (0.018 mole) 4-acetoxybenzoic acid, by the procedure described in Example 1.

The polymerization was repeated using 20, 30, 40 mole percent of poly(ethylene terephthalate) and different molar ratios of comonomers. Table 3 lists the basic properties of these polymers.

TABLE 3

Yields and properties of polyesters 3a to 3f

| Formula | m/n/o/p[a] | Yield (%) | $\eta_{inh}^{b)}$ (dL/g) | $T_g^{c)}$/ °C. | $T_m^{c)}$/ °C. |
|---|---|---|---|---|---|
| 3a | 40/18/18/24 | 84 | 0.46 | 112 | amorph. |
| 3b | 30/21/21/28 | 82 | 0.49 | 131 | amorph. |
| 3c | 20/24/24/32 | 72 | 0.51 | 143 | amorph. |
| 3d | 40/15/15/30 | 83 | 0.41 | 108 | amorph. |
| 3e[d] | 30/17,5/17,5/30 | 77 | 0.66 | 126 | amorph. |
| 3f[d] | 20/20/20/40 | 77 | 0.76 | 142 | amorph. |

[a] molar feed ratio
[b] measured at 20° C. with c = 2g/L in CHCl$_3$/trifluoroacetic acid (8/2) by volume
[c] from DSC measurements with a heating rate of 20° C./min
[d] polymerized with Ti(IV)isopropylate catalyst It can be seen that the glass transition temperatures of these totally amorphous liquid crystalline poly(ester imide)s are now again much higher than that of conventional poly (ethylene terephthalate)/4-acetoxybenzoic acid-materials and can be controlled with the amount of poly(ethylene terephthalate). The inherent viscosities in the range of 0.46–0.76 Dl/g are found to be advantageous in particular in blends with polyolefins.

EXAMPLE 4

This example illustrates the preparation of a copoly(ester-imide) from poly(ethylene terephthalate), N-(4'-carboxyphenyl)trimellitic acid imide, 3-(tert-butyl)-1,4-diacetoxybenzene and 4-acetoxybenzoic acid (cf. formulas 4a to 4f in FIG. 2)

A copoly(esterimide) is prepared with 2.88 g (0.015 moles) of poly(ethylene terephthalate), 5.60 g (0.018 moles) of N-(4'-carboxyphenyl)trimellitic acid imide, 4.50 g (0.018 moles) of 3-(tert-butyl)-1,4-diacetoxybenzene and 4.32 g (0.024 moles) of 4-acetoxybenzoic acid, by the procedure described in Example 1.

The polymerization was repeated using 20, 30, 40 mole percent of poly(ethylene terephthalate) and different molar ratios of comonomers. Table 4 lists the basic properties of these polymers.

TABLE 4

Yields and properties of polyesters 4 a–f

| Formula | m/n/o/p[a] | Yield (%) | $\eta_{inh}^{b)}$ (dL/g) | $T_g^{c)}$/ °C. | $T_m^{c)}$/ °C. |
|---|---|---|---|---|---|
| 4a | 40/18/18/24 | 66 | 0.45 | 115 | amorph. |
| 4b | 30/21/21/28 | 67 | 0.50 | 137 | amorph. |
| 4c | 20/24/24/32 | 67 | 0.45 | 148 | amorph. |
| 4d | 40/15/15/30 | 70 | 0.45 | 114 | amorph. |
| 4e | 30/17,5/17,5/30 | 72 | 0.57 | 129 | amorph. |
| 4f | 20/20/20/40 | 78 | 0.58 | 145 | amorph. |

[a] molar feed ratio
[b] measured at 20° C. with c = 2g/L in CHCl$_3$/trifluoroacetic acid (8/2) by volume
[c] from DSC measurements with a heating rate of 20° C./min The data given above in Table 4 indicate that when all of the 3-phenyl-1,4-diacetoxy-benzene is replaced by 3-(tert-butyl)-1,4-diacetoxybenzene, found to be useful in this invention, the glass transition temperatures of these liquid crystalline, totally amorphous poly(ester imide)s are now again high and can be controlled over a wide range depending on the aliphatic content of the polymer.

EXAMPLES 5 AND 6

Figure 3A:
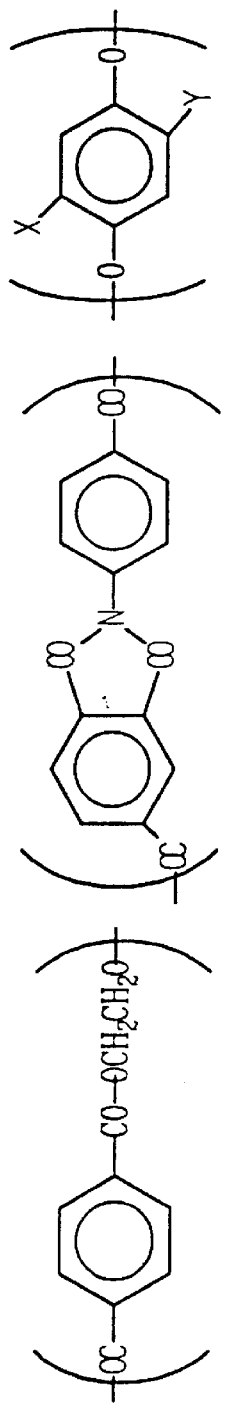
Figure 3A:
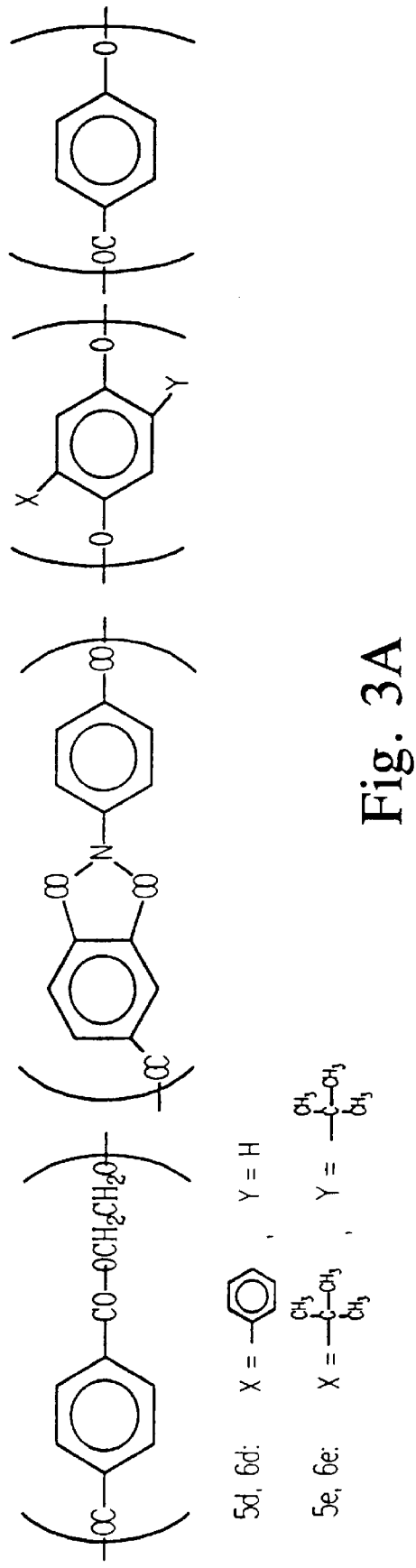
Figure 3B:
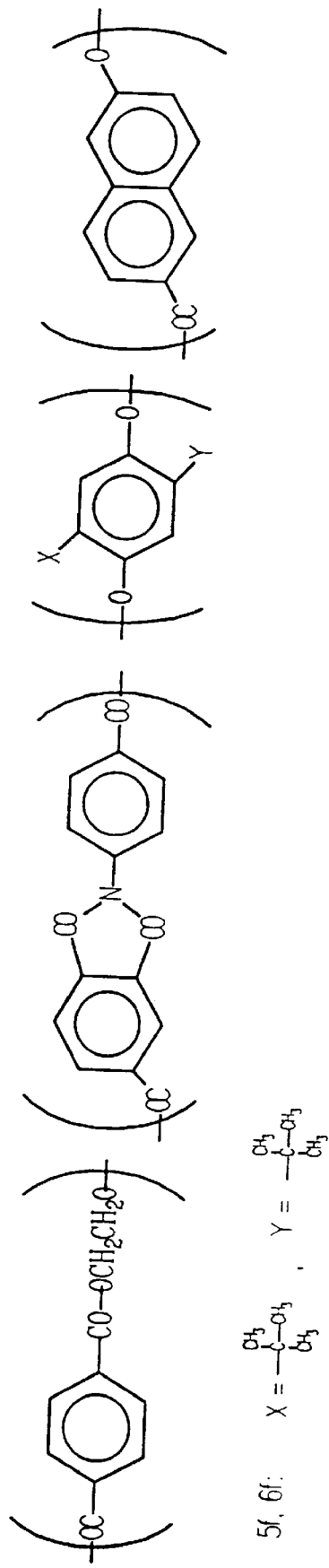

These examples illustrate the preparation of a copoly(ester-imide) using differently mono- or disubstituted diacetoxybenzenes or a mixture of them (cf. formulas 5a to 5f and 6a to 6f in FIGS. 3A and 3B).

A copoly(esterimide) is prepared from 5.76 g (0.03 moles) of poly(ethylene terephthalate), 7.00 g (0.022 moles) of N-(4'-carboxyphenyl)trimellitic acid imide, 3.04 g (0.011 moles) 3-(phenyl)-1,4-diacetoxybenzene and 2.57 g (0.011 moles) 3-(chloro)-1,4-diacetoxybenzene, by the procedure described in Example 1.

The polymerization was repeated using 20 and 40 mole percent of poly(ethylene terephthalate) and different molar ratios of comonomers. Tables 5 and 6 list the basic properties of these polymers.

TABLE 5

Yields and properties of polyesters 5a to 5f

| Formula | m/n/o/p[a] | Yield (%) | $\eta_{inh}$[b] (dL/g) | $T_g$[c]/ °C. | $T_m$[c]/ °C. |
|---|---|---|---|---|---|
| 5a | 40/30/30 | 82 | 0.33 | 133 | amorph. |
| 5b | 40/30/30 | 68 | 0.33 | 144 | amorph. |
| 5c | 40/30/15/15 | 83 | 0.33 | 124 | amorph. |
| 5d | 40/20/20/20 | 79 | 0.50 | 122 | amorph. |
| 5e | 40/20/20/20 | 71 | 0.38 | 146 | amorph. |
| 5f | 40/20/20/20 | 76 | 0.39 | 145 | amorph. |

[a]molar feed ratio
[b]measured at 20° C. with c = 2g/L in CHCl$_3$/trifluoroacetic acid (8/2) by volume
[c]from DSC measurements with a heating rate of 20° C./min

TABLE 6

Yields and properties of polyesters 6a to 6f

| Formula | m/n/o/p[a] | Yield (%) | $\eta_{inh}$[b] (dL/g) | $T_g$[c]/ °C. | $T_m$[c]/ °C. |
|---|---|---|---|---|---|
| 6a | 20/40/40 | 82 | 0.47 | 155 | amorph. |
| 6b | 20/40/40 | 82 | 0.31 | 168 | amorph. |
| 6c | 20/40/20/20 | 83 | 0.53 | 153 | amorph. |
| 6d | 20/26,6/26,6/26,6 | 88 | 0.61 | 148 | amorph. |
| 6e | 20/26,6/26,6/26,6 | 71 | —[d] | 173 | amorph. |
| 6f | 40/26,6/26,6/26,6 | 76 | —[d] | 144 | amorph. |

[a]molar feed ratio
[b]measured at 20° C. with c = 2g/L in CHCl$_3$/trifluoroacetic acid (8/2) by volume
[c]from DSC measurements with a heating rate of 20° C./min
[d]not totally soluble The glass transition temperatures of these totally amorphous poly(ester imide)s are now again high and can be controlled over a wide temperature range between 120° C. and 175° C., depending on the molar amount of poly(ethylene terephthalate).

EXAMPLES 7 AND 8

Figure 4:
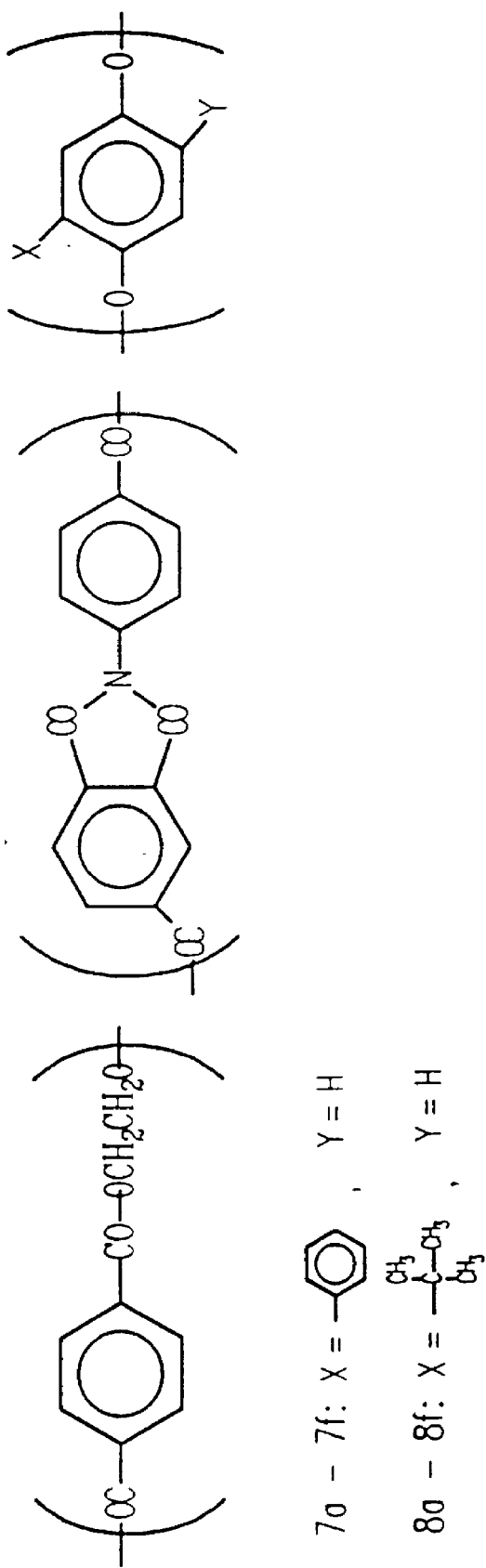

These examples illustrate the dependence of glass transition temperatures on the molar amount of poly(ethyleneterephtahalate) in copoly(ester-imide)s based on substituted diacetoxybenzenes and N-(4'-carboxyphenyl) trimellitic acid (cf. formulas 7a to 7f and 8a to 8f in FIG. 4).

A copoly(esterimide) is prepared from 9.60 g (0.05 moles) of poly(ethylene terephthalate), 3.34 g (0.011 moles) of N-(4'-carboxyphenyl)trimellitic acid imide, and 2.90 g (0.011 moles) of 3-(phenyl)-1,4-diacetoxybenzene by the procedure described in Example 1.

The polymerization was repeated using 20–70 mole percent of poly(ethylene terephthalate) and different molar ratios of comonomers. Tables 7–8 list the basic properties of these polymers.

TABLE 7

Yields and properties of polyesters 7a to 7f

| Formula | m/n/p[a] | Yield (%) | $\eta_{inh}$[b] (dL/g) | $T_g$[c]/ °C. | $T_m$[c]/ °C. |
|---|---|---|---|---|---|
| 7a | 70/15/15 | 81 | 0.30 | 107 | amorph. |
| 7b | 60/30/30 | 93 | 0.31 | 119 | amorph. |
| 7c | 50/25/25 | 95 | 0.37 | 133 | amorph. |
| 7d | 40/30/30 | 94 | 0.46 | 138 | amorph. |
| 7e | 30/35/35 | 77 | 0.45 | 151 | amorph. |
| 7f | 20/40/40 | 83 | 0.47 | 155 | amorph. |

[a]molar feed ratio
[b]measured at 20° C. with c = 2g/L in CHCl$_3$/trifluoroacetic acid (8/2) by volume
[c]from DSC measurements with a heating rate of 20° C./min

TABLE 8

Yields and properties of polyesters 8a to 8f

| Formula | m/n/p/o[a] | Yield (%) | $\eta_{inh}$[b] (dL/g) | $T_g$[c]/ °C. | $T_m$[c]/ °C. |
|---|---|---|---|---|---|
| 8a | 70/15/15 | 72 | 0.37 | 106 | amorph. |
| 8b | 60/30/30 | 74 | 0.59 | 122 | amorph. |
| 8c | 50/25/25 | 79 | 0.67 | 131 | amorph. |
| 8d | 40/30/30 | 78 | 0.62 | 143 | amorph. |
| 8e | 30/35/35 | 74 | 0.58 | 158 | amorph. |
| 8f | 20/40/40 | 74 | 0.48 | 172 | amorph. |

[a]molar feed ratio
[b]measured at 20° C. with c = 2g/L in CHCl$_3$/trifluoroacetic acid (8/2) by volume
[c]from DSC measurements with a heating rate of 20° C./min The glass transition temperatures of these totally amorphous poly(ester imide)s are now again high and can be controlled over a wide temperature range between 105° C. and 170° C., depending on the molar amount of poly(ethylene terephthalate).

EXAMPLE 9

Figure 5:
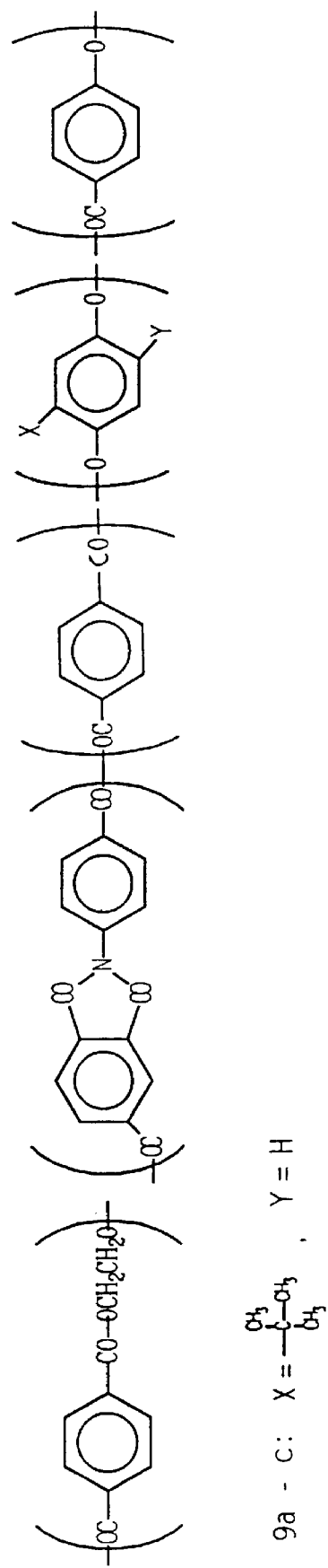

This example illustrates the preparation of a copoly(ester-imide) using a mixture of N-(4'-carboxyphenyl)trimellitic acid and 1,4-benzene dicarboxylic acid, substituted 1,4-diacetoxybenzene, an aromatic hydroxyacid and poly(ethylene terephthalate) (cf. formulas 9a to 9c in FIG. 5).

A copoly(esterimide) is prepared from 21.6 g (0.11 moles) of poly(ethylene terephthalate), 11.7 g (0.038 moles) of N-(4'-carboxyphenyl)trimellitic acid imide, 46.9 g (0.19 moles) of 3-tert-butyl-1,4-diacetoxybenzene, 24.9 g (0.15 moles) of 1,4-dicarboxy-benzene and 47.3 g (0.26 moles) of 4-acetoxy-benzoic acid by the procedure described in Example 1, with the exception that the maximum temperature was kept at 285° C. for eight hours.

The polymerization was repeated using 5–20 mole percent of terephthalic acid and different molar ratios of comonomers. Table 9 lists the basic properties of these polymers.

TABLE 9

Yields and properties of polyesters 9a to 9c

| Formula | m/n/p/o/r[a] | Yield (%) | $\eta_{inh}$[b] (dL/g) | $T_g$[c]/ °C. | $T_m$[c]/ °C. |
|---|---|---|---|---|---|
| 9a | 15/5/20/25/35 | 89 | 0.38 | 134 | amorph. |
| 9b | 15/10/15/25/35 | 97 | 0.34 | 140 | amorph. |
| 9c | 15/15/10/25/35 | 96 | 0.35 | 145 | amorph. |
| 9d | 15/0/25/25/35 | 95 | 0.61 | 132 | amorph. |

[a] molar feed ratio
[b] measured at 20° C. with c = 2g/L in $CHCl_3$/trifluoroacetic acid (8/2) by volume
[c] from DSC measurements with a heating rate of 20° C./min The glass transition temperatures of these totally amorphous liquid crystalline poly(ester imide)s are now again high and can be controlled with the molar amount of N-(4'-carboxyphenyl)trimellitic acid imide, as well as poly (ethylene terephthalate).

EXAMPLE 10

This example illustrates the preparation of a copoly(ester-imide) based on N-(4'-carboxyphenyl)trimellitic acid (abbreviated 4-IMIDE) and poly(ethylene naphthalene) (PEN).

Thus 10.89 g of PEN and 16.81 g of 4-IMIDE and 13.52 g of 3-tert-butyl-1,4-di-acetoxybenzene (TBHQA) and/or 16.55 g of di-3-tert-butyl-1,4-diacetoxybenzene (Di-TBHQA) and/or 12.97 g of 4-acetoxy benzoic acid (PAB) and/or 16.57 g of 2-acetoxy-6-naphthoic acid (HNA) and/or 14.60 g of 3-phenyl-1,4-diacetoxybenzene (Ph-HQA) were polymerized for 2 to 2.5 hours at 285° C. in nitrogen atmosphere and for 4 hours under vacuum.

The results of the polymerization processes are indicated in table 10.

The polymerization of the three first polymers (10a–10c) was carried out as explained in Example 8, the polymerization of the fourth polymer was carried out according to Example 4 and the polymerization of the three last polymers (10e–10g) according to Example 7.

TABLE 10

LCP's containing poly(ethylene naphthalene)

| Polymer | Composition/molar ratio | Viscosity [dL/g] | $T_g$ [°C.] | $T_m$ [°C.] |
|---|---|---|---|---|
| 10a | PEN/4-IMIDE/TBHQA; 29:39:32 | 0.26 | 157.2 | amorph. |
| 10b | PEN/4-IMIDE/TBHQA/HNA; 20:27:22:31 | 0.21 | 137.5 | amorph |
| 10c | PEN/4-IMIDE/TBHQA/PAB; 20:27:22:31 | 0.12 | 136.7 | amorph. |
| 10d | PEN/4-IMIDE/Di-TBHQA-/PAB; 21:29:17:33 | 0.31 | 154.3 | amorph. |
| 10e | PEN/4-IMIDE/PH-HQA; 29:29:32 | 0:39 | 151.9 | amorph. |
| 10f | PEN/4-IMIDE/Ph-HQA/HNA; 29:27:22:31 | not soluble | 135.2 | amorph. |
| 10g | PEN/4-IMIDE/Ph-HQA/PAB; 20:27:22:31 | 0.26 | 139.2 | amorph. |

EXAMPLE 11

This example illustrates the preparation of a copoly(ester-imide) based on N-(4'-carboxyphenyl)trimellitic acid (abbreviated 4-IMIDE) and poly(butylene terephthalate) (PBT).

Thus 9.90 g of PBT and 16.81 g of 4-IMIDE and 13.52 g of 3-tert-butyl-1,4-di-acetoxybenzene (TBHQA) and/or 16.55 g of di-3-tert-butyl-1,4-diacetoxybenzene (Di-TBHQA) and/or 12.97 g of 4-acetoxy benzoic acid (PAB) and/or 16.57 g of 2-acetoxy-6-naphthoic acid (HNA) and/or 14.60 g of 3-phenyl-1,4-diacetoxybenzene (Ph-HQA) were polymerized for 2 to 2.5 hours at 285° C. in nitrogen atmosphere and for 4 hours under vacuum.

The results of the polymerization processes are indicated in table 11.

The polymerization of the three first polymers (11a–11c) was carried out as explained in Example 7, the polymerization of the fourth polymer was carried out according to Example 8 and the polymerization of the two last polymers (11e and 11f) according to Example 4.

TABLE 11

LCP's containing poly(butylene terephthalate)

| Polymer | Composition/molar ratio | Viscosity [dL/g] | $T_g$ [°C.] | $T_m$ [°C.] |
|---|---|---|---|---|
| 11a | PBT/4-IMIDE/Ph-HQA; 29:39:32 | 0.05 | 108.1 | amorph. |
| 11b | PBT/4-IMIDE/Ph-HQA/PAB; 20:27:22:31 | 0.65 | — | 189.9 |
| 11c | PBT/4-IMIDE/Ph-HQA/HNA; 20:27:22:31 | 0.11 | 123.7 | amorph. |
| 11d | PBT/4-IMIDE/TBHQA; 29:39:32 | not soluble | 125 | 182. |
| 11e | PBT/4-IMIDE/TBHQA/PAB; 20:27:22:31 | 0.39/0.21 | 70/130 | 191.5. |
| 11f | PBT/4-IMIDE/TBHQA/HNA; 20:27:22:31 | 0.095 | 120 | amorph. |

EXAMPLE 12

A copoly(ester-imide) containing a polyester structural unit derived from poly(butylene naphthalate) (PBN) was prepared by copolymerizing 13.29 g (20 mol-%) of PBN, 16.81 g (27 mol-%) of 4-IMIDE, 13.52 g (22 mol-%) of TBHQA and 12.97 g (31 mol-%) of PAB. The polymerization was carried out according to Example 8.

The amorphous copolymer thus prepared has a viscosity of 0.39 dL/g and a $T_g$ of 123.2° C.

EXAMPLE 13

A copoly(ester-imide) containing a structural polyester unit derived from poly(cyclohexanol terephthalate) (PCT) was prepared by copolymerizing 12.00 g (20 mol-%) of PCT, 16.81 g (27 mol-%) of 4-IMIDE, 13.52 g (22 mol-%) of TBHQA and 12.97 g (31 mol-%) of PAB. The polymerization was carried out according to Example 8.

The amorphous copolymer thus prepared has a viscosity of 0.30 dL/g and a $T_g$ of 127.5° C.

EXAMPLE 14

The copoly(ester-imide)s prepared in Example 9 were blended with a polyethylene polymer and compounded in an extruder and shaped into bars. The molded bars thus prepared exhibit desirable mechanical properties suitable for commercial applications as engineering materials or reinforcing materials in blends, as indicated in Table 10.

TABLE 12

Mechanical properties of poly(ester-imide)s 9a–9c

| Property | Poly(ester-imide) 9a | Poly-(ester-imide) 9b | Poly-(ester-imide) 9c | Rodrun LC-3000 ® |
|---|---|---|---|---|
| Tensile strength [MPa] | 58 | 52 | 48 | 116 |
| Tensile modulus [GPa] | 11.5 | 12.3 | 13.0 | 12.4 |
| Tensile elongation [%] | 0.5 | 0.4 | 0.3 | 1.8 |
| Flexural strength [MPa] | 144 | 153 | 162 | — |
| Flexural modulus [GPa] | 10.0 | 10.6 | 10.8 | 10.7 |
| HDT [°C.] | 132 | 137 | 142 | 77 |

Figure 6:
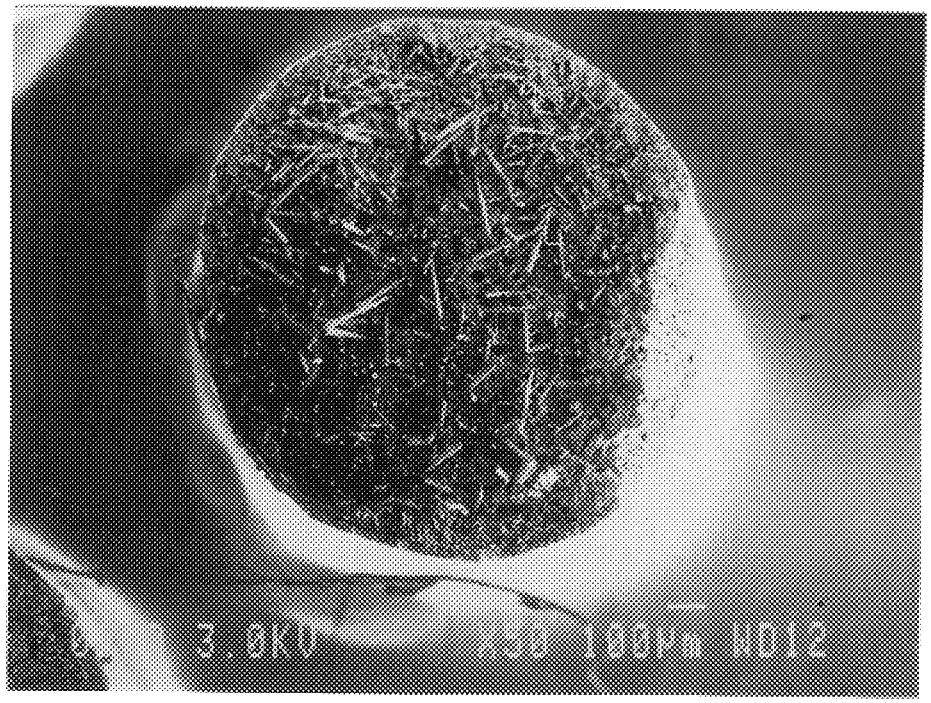
FIGS. 6 and 7 represent SEM micrographs of the fractured surfaces of uncompatibilized polyethylene/copoly (ester-imide) blends mixed in an extruder.
Figure 7:
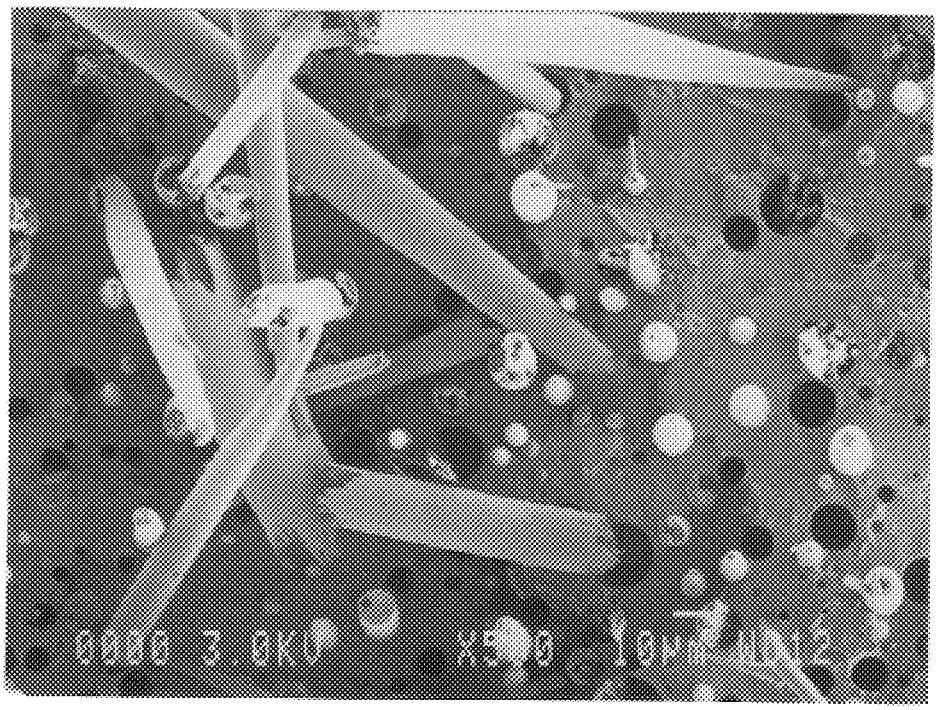

FIGS. 6 and 7 represent SEM micrographs of the fractured surfaces of the uncompatibilized PE/poly(ester-imide) blends.

We claim:

1. A liquid crystalline aromatic copoly(ester-imide) polymer, comprising at least one structural unit of formula (I)

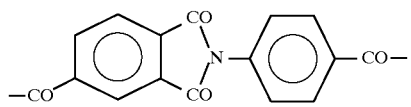

or formula (II)

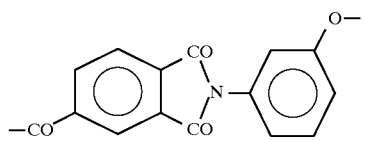

and a structural unit of formula (III)

wherein Ar is phenylene or naphthalenylene, al is an aliphatic residue containing 1–6 carbon atoms and n is an integer from 1 to 500, the molar ratio between the structural unit of formula (III) and the structural unit of formula (I) or formula (II), respectively, being from 1:100 to 100:1.

2. The copoly(ester-imide) according to claim 1, which contains in combination with the structural unit of formula (I) at least one structural unit of the following formulas (IV) and (V)

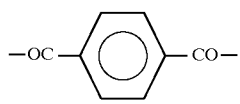

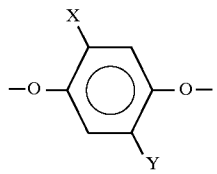

wherein each X and Y independently represents hydrogen, chloro, phenyl or an alkyl group containing 1 to 4 carbon atoms, and (VI) and (VII)

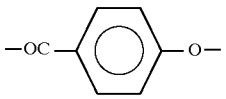

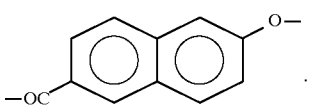

3. The copoly(ester-imide) according to claim 2, wherein the polymer contains structural units of formulas (III), (I) and (V), the molar ratio of the structural units of formula (III) to the sum of the other structural units of the polymer being about 1:99 to 60:40.

4. The copoly(ester-imide) according to claim 2, wherein the molar ratio of the structural units of formula (I) to the structural units of formula (V) is 0.8:1–1:0.8.

5. The copoly(ester-imide) according to claim 2, wherein the polymer contains structural units of formulas (III), (I) and (V) together with structural units of formulas (VI) or (VII), the molar ratio of the structural units of formula (III) to the sum of the other structural units of the polymer being about 1:99 to 60:40.

6. The copoly(ester-imide) according to claim 2, wherein the molar ratio of the structural units of formula (I) to sum of the structural units of formulas (V) and (VI) or (VII) is 1:100–100:1.

7. The copoly(ester-imide) according to claim 2, wherein the polymer contains in combination with the structural unit of formula (II) at least one structural unit of formula (VII), the molar ratio of the structural units of formula (III) to the sum of the structural units of formulas (II) and (VII) being about 1:99 to 60:40.

8. The copoly(ester-imide) according to claim 2, wherein the polymer contains in combination with the structural unit of formula (II) at least one structural unit of formula (VI) and at least one structural unit of formula (VII), the molar ratio of the structural units of formula (III) to the sum of the other structural units of the polymer being about 1:99 to 60:40.

9. The copoly(ester-imide) according to claim 7, wherein the molar ratio of the structural units of formula (II) to the structural units of formula (VII) and optionally (VI) is from 1:100 to 100:1.

10. A liquid crystalline copoly(ester-imide) containing the structural units derived from N-(4'-carboxyphenyl) trimellitic acid, 1,4-benzene dicarboxylic acid, substituted 1,4-dihydroxybenzene, an aromatic hydroxyacid and a poly (alkylene terephthalate), a poly(alkylene naphthalate) or poly(cyclohexanol terephthalate).

11. The copoly(ester-imide) according to claim 1, wherein the glass transition temperature of said polymer is about 100° to 190° C.

12. The copoly(esteri-imide) according to claim 1, wherein the inherent viscosity of said polymer, measured in a mixture of CHCl$_3$ and trifluoroacetic acid at a concentration of 2 g/l, is about 0.4 to 1.0 dL/g.

13. The copoly(ester-imide) according to claim 1, wherein the inherent viscosity of poly(ethylene terephthalate) is about 0.5 to 1.0 dL/g.

14. A process for preparing a liquid crystalline copoly (ester-imide), comprising the step of polycondensing at least one aromatic polyester comprising poly(alkylene terephthalate), poly(alkylene naphthalate) and poly (cyclohexanol terephthalate) with N-(3'-hydroxyphenyl)-trimellitic acid imide or N-(4'-carboxyphenyl)trimellitic acid imides or with derivatives thereof.

15. The process according to claim 14, wherein the aromatic polyester and N-(3'-hydroxyyphenyl)-trimellitic acid imide or derivatives thereof are polycondensed with 2-hydroxy-6-naphthoic acid or a derivative thereof and/or with a 1,4-benzene dicarboxylic acid or a derivative thereof.

16. The process according to claim 15, wherein the molar ratio of the aromatic polyester terephthalate to the sum of the imide and the naphthoic acid and carboxylic acid is about 1:99 to 60:40.

17. The process according to claim 14, wherein the aromatic polyester and N-(4'-carboxyphenyl)trimellitic acid imide or derivatives thereof are polycondensed with a substituted 1,4-dihydroxybenzene, the substituent comprising hydrogen, chloro, phenyl or a $C_{1-12}$-alkyl, and/or with 4-hydroxybenzoic acid or a derivative thereof.

18. The process according to claim 17, wherein the molar ratio of the aromatic polyester to the sum of the imide and the dihydroxybenzene and the benzoic acid is about 1:99 to 60:40.

19. The process according to claim 14, wherein the copoly(ester-imide)s are prepared according to the acetate method by at least partially acetylating the hydroxyl groups of the starting compounds before esterification.

20. The process according to claim 14, wherein the copoly(ester-imide)s are prepared by transesterification.

21. A polymer blend, which includes a polymer matrix containing thermoplastics blended with liquid crystalline plastics, wherein the liquid crystalline component comprises a polymer according to claim 1.

22. The polymer blend according to claim 21, wherein the polymer matrix comprises a polyolefin or a copolymer of olefinic monomers, a polyester, a polyamide, a polyether, polystyrene, polyvinylchloride, a polyacrylic, a polycarbonate, a polyketone, a polyetherimide or a polyimide.

23. The polymer blend according to claim 22, wherein the comonomers comprise vinyl acetate, butyl acrylate, methyl acrylate and ethyl acrylate.

24. A polymer product, comprising a copolyester according to claim 1 blended with a polymer matrix and shaped into said product by molding.

25. The polymer product according to claim 24, wherein said product is prepared by injection molding, blow molding, extrusion, melt spinning or deep drawing.

26. The polymer product according to claim 24, wherein said product is in the form of a fibre, filament or film.

27. The polymer product according to claim 24, wherein said product is in the form of a tube, pipe or sheath.

28. The polymer product according to claim 24, wherein said product is shaped into structural parts of a cable or into a sheath of a cable.

29. The copoly(ester-imide) according to claim 3, wherein the molar ratio of the structural units of formula (III) to the sum of the other structural units of the polymer is about 10:90 to 50:50.

30. The copoly(ester-imide) according to claim 5, wherein the molar ratio of the structural units of formula (III) to the sum of the other structural units of the polymer is about 10:90 to 50:50.

31. The copoly(ester-imide) according to claim 7, wherein the molar ratio of the structural units of formula (III) to the sum of the structural units of formulas (II) and (VII) is about 10:90 to 50:50.

32. The copoly(ester-imide) according to claim 8, wherein the molar ratio of the structural units of formula (III) to the sum of the other structural units of the polymer is about 10:90 to 50:50.

33. The copoly(ester-imide) according to claim 11, wherein the glass transition temperature is about 105° C. to 175° C.

34. The copoly(ester-imide) according to claim 12, wherein the inherent viscosity is about 0.45 to 0.80 dL/g.

35. The process according to claim 16, wherein the molar ratio of the aromatic polyester terephthalate to the sum of the imide and the naphthoic acid and carboxylic acid is about 5:95 to 60:40.

36. The process according to claim 35, wherein the molar ratio of the aromatic polyester terephthalate to the sum of the imide and the naphthoic acid and carboxylic acid is about 10:90 to 50:50.

37. The process according to claim 17, wherein the substituent $C_{1-12}$-alkyl is $C_{1-4}$-alkyl.

38. The process according to claim 18, wherein the molar ratio of the aromatic polyester to the sum of the imide and the dihydroxybenzene and the benzoic acid is about 5:95 to 60:40.

39. The process according to claim 38, wherein the molar ratio of the aromatic polyester to the sum of the imide and the dihydroxybenzene and the benzoic acid is about 10:90 to 50:50.

40. The polymer blend according to claim 22, wherein the polyacrylic is poly-R-acrylate or poly-R-methacrylate, where R is a lower alkyl group.

41. The polymer blend according to claim 22, wherein the polyketone is polyetheretherketone.

* * * * *